United States Patent
Decker

Patent Number: 5,437,528
Date of Patent: Aug. 1, 1995

[54] DEVICE FOR HARVESTING AND LOADING OR UNLOADING AND INSTALLING LARGE ROLLS OF SOD

[75] Inventor: Henry F. Decker, Ostrander, Ohio

[73] Assignee: Buckeye Bluegrass Farms, Ostrander, Ohio

[21] Appl. No.: 195,016

[22] Filed: Feb. 14, 1994

Related U.S. Application Data

[63] Continuation of Ser. No. 858,641, Mar. 27, 1992, abandoned.

[51] Int. Cl.$^6$ ............................................. A01D 87/12
[52] U.S. Cl. ..................... 414/24.6; 414/786; 414/523; 414/539; 414/399; 414/24.5; 414/908; 414/911; 414/920; 414/391; 212/246; 242/403; 242/597.4; 242/559.1
[58] Field of Search .............. 414/390, 391, 392, 908, 414/911, 399, 920, 24.5, 523, 24.6, 546, 539, 144.3; 172/1, 2, 4, 5, 19, 20; 212/245, 246; 242/403, 597.4, 559.1

[56] References Cited

U.S. PATENT DOCUMENTS

| | | | |
|---|---|---|---|
| 2,134,043 | 10/1938 | Hoppe et al. | 242/597.4 |
| 2,765,991 | 10/1956 | Frey et al. | |
| 3,099,358 | 7/1963 | Clark | 212/246 X |
| 3,968,940 | 7/1976 | Godbersen | 242/559.1 X |
| 4,354,556 | 10/1982 | Evans | 414/911 X |
| 4,648,769 | 3/1987 | Stirling | 414/24.6 |
| 4,886,409 | 12/1989 | Penner | 414/24.6 |
| 5,026,238 | 6/1991 | Walt | 414/24.5 |

Primary Examiner—Frank E. Werner
Attorney, Agent, or Firm—Isaac A. Angres

[57] ABSTRACT

A novel mechanism is presented that is able to harvest and load and to unload and install large rolls of sod with only one worker. It is equally useful with conventional sods grown on soil as well as sods grown over an impervious surface. The device is attached by a shiftable bracket to the utility mounting plate and hydraulics of a suitable tractor, skid steer loader, or modified fork lift. It consists of a steel spear or prong attached to a clevis that rotates slightly more than 180 degrees. Cones are placed on the hinged spear and these position PVC pipe or other tubing of the same length as the sod roll desired. The spear with cone(s) and tubing is placed at a right angle, either to the left or right, of the direction of the loader and dropped to the surface at the end of a cut sheet of sod. Small protrusions or prongs on the surface of the tubing lightly grasp the sod and begin rolling it up on the tubing. When the sod roll reaches the desired size, it is lifted, changed to a forward position, transported to, and loaded on a truck bed. At the laying site the process is reversed: the hinged spear is inserted into the tube, and the sod roll is lifted off the truck bed. It is carried to the laying site in the forward position where the sod roll is shifted 90 degrees forming a right angle to the loader, lift, or tractor. The sod roll is placed on the ground and carefully unrolled by the movement of the tractor and by the rotating tube and cone(s). The large roll of sod is thus installed by the careful work of one operator.

13 Claims, 2 Drawing Sheets

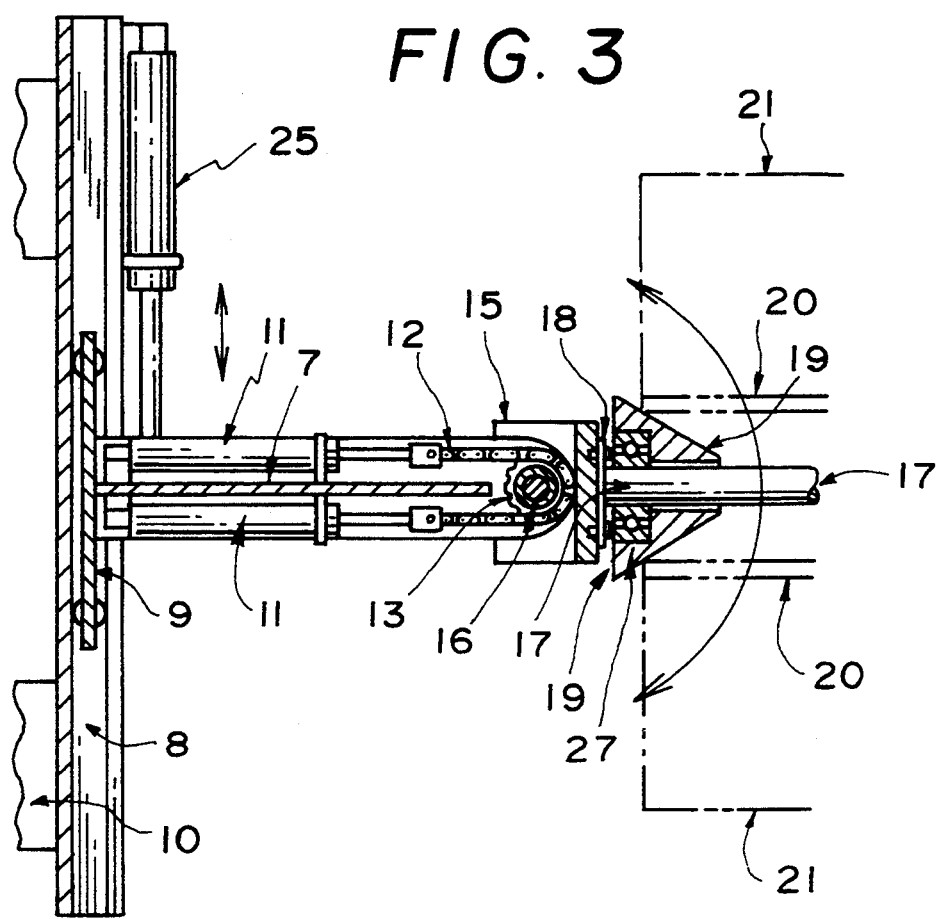
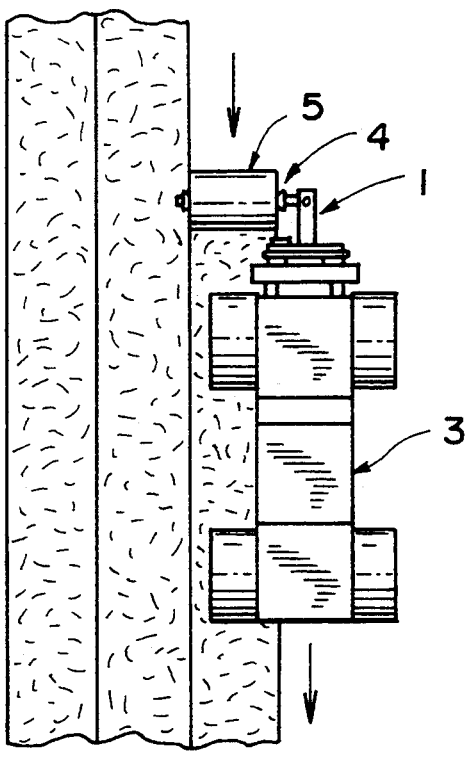
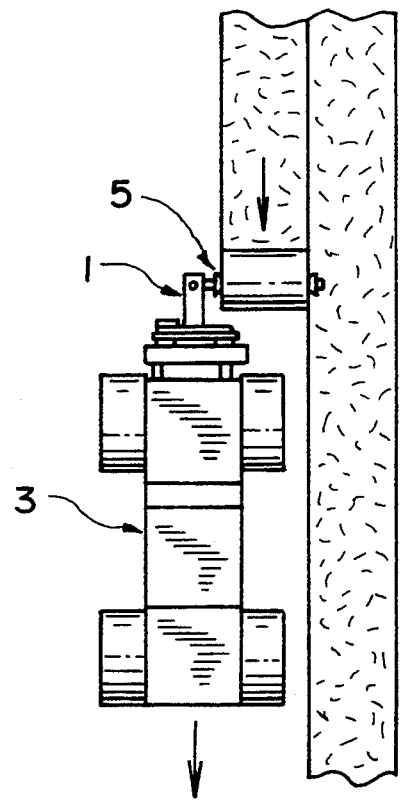

DEVICE FOR HARVESTING AND LOADING OR UNLOADING AND INSTALLING LARGE ROLLS OF SOD

This application is a continuation of U.S. application Ser. No. 07/858,641 filed Mar. 27, 1992, now abandoned.

TECHNICAL FIELD

This invention relates generally to sod production and more particularly to the method of growing sods over an impervious surface. It has been preceded by a patent disclosure document (Ser. No. 294,725), and it compliments an innovative system of growing grass sods in various composted materials over plastic sheeting for which a patent has been issued earlier (U.S. Pat. No. 4,986,026).

BACKGROUND OF THE INVENTION

The concept of growing grasses over an impervious surface, typically plastic sheeting, goes back, at least in the United States, to experiments I conducted at Ohio Wesleyan University, in Delaware, Ohio, in the 1960's. I proved at that time that many types of grasses would grow well and produce sods rapidly in various contrived media placed over plastic sheeting.

Sods grown in this manner are usually much lighter than conventional mineral sods. Early in the research on this concept, it was obvious that lighter sods could be handled more economically in large rolls rather than the typical one square yard roll or sheet common to conventional sodding. It occurred to me that if I could produce large but light rolls of sod on the order of 30 to 50 square yards per roll, and if these could be handled by machine, then it would be possible to obviate large laying crews and the labor intensive characteristic of the conventional sod industry.

I therefore invented a device whereby one person can harvest and load large rolls of sod, and the device can also be used by one person to unload and lay or install sod rolls of any size. Furthermore it can be used to handle conventional soil grown sod rolls as well as those grown on an impervious surface such as concrete or plastic sheeting.

SUMMARY OF THE INVENTION

This invention is a device which enables a single worker to roll up sod on PVC pipe or any tubing and load it on a truck bed; and, at the installation site, using the same type of mechanism, a single worker can unload, unroll, and install the sod. The device obviates the large laying crew typically associated with conventional sodding.

The device is attached to the utility mounting plate of a skid steer loader, or tractor, or modified fork lift. It is comprised of a heavy duty steel I beam which supports and protects gears, or hydraulic cylinders, or rack and pinion gear, or hydraulic or electric motors any of which is able to swing through an arc of slightly greater than 180 degrees a clevis to which is attached a round, hollow, prong or spear.

A cone is placed on the spear or prong and is able to rotate. PVC pipe or any type of tubing is placed over the spear and engaged by or housed against the cone. A second cone can be placed if necessary toward the tip end of the spear to engage and steady the other end of the tube. The length of the PVC tubing is determined by the width of sod roll desired.

The spear with cone(s) and tubing is placed at a right angle, either to the right or to the left, of the direction of the loader and dropped to the surface at the end of a sheet of cut sod. Small protrusions, or prongs, on the surface of the tubing lightly grasp the sod and begin rolling it up on the tubing as the tractor or loader proceeds in a steady direction until the sod roll reaches the desired proportions or diameter.

The sod roll is then picked up by the mechanism using the hydraulic capacities of the loader or tractor. The spear and sod roll can be changed to a forward position parallel to the direction of movement and then transported to the truck bed. Here it is lifted and positioned on the truck bed with the tube at a right angle to the center axis of the truck. Once the roll is properly situated on the truck bed, the hinged spear and prong are withdrawn from the sod roll by the backward movement of the tractor, lift, or loader.

At the laying site the process is reversed. The hinged spear is inserted into the tube of the sod roll on the truck bed, and the roll is lifted up and off the truck. It is transported in the forward position to the laying site. The tractor is carefully positioned at the laying site; the axis of the spear and sod roll are then changed 90 degrees forming a right angle to the loader, tractor or lift. The sod roll is dropped to the surface of the laying site and instead of rolling up the sod as in the case of harvesting, the sod is now carefully unrolled by the movement of the tractor, loader, or lift and by the rotating tube and cone(s). The large roll of sod can thus be laid solely by the careful work of one equipment operator.

The bracket that attaches the device to the utility mounting plate can be designed to shift left or right by a rack and pinion gear or a hydraulic cylinder. This gives the operator better control in positioning the sod making it possible for him to shift the roll left or right to facilitate laying or to acheive better balance.

BRIEF DESCRIPTION OF THE DRAWINGS

FIG. 3 is a sectional view along line 3—3 of FIG. 2.

FIG. 4 is a plan view of the sod device harvesting sod.

FIG. 5 is a similiar view to FIG. 4 showing the sod device installing sod.

DETAILED DESCRIPTION OF THE INVENTION

Figure 1:
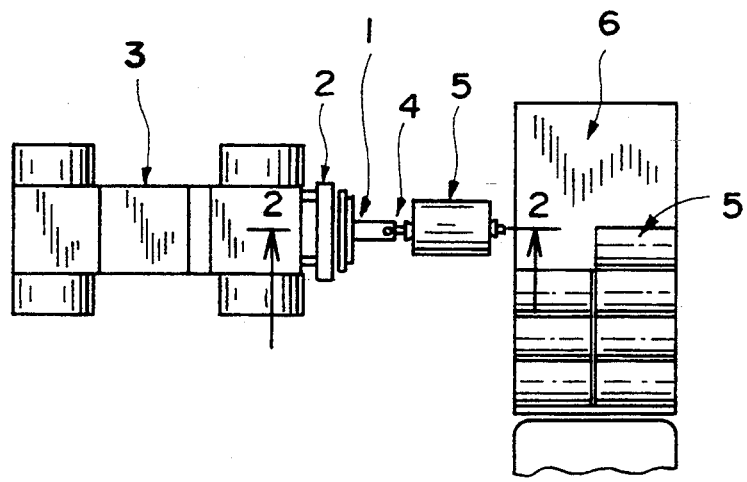
FIG. 1 is a plan view of a tractor with the sod device loading or unloading a truck.

A preferred embodiment of the invention is presented in the drawings that follow. Referring now more particularly to FIG. 1, the device (1) is shown mounted by utility plate (2) onto the front end of a tractor (3), skid steer loader, or modified fork lift. Its spear (4) or prong, shown here in the forward position, is inserted through the tubing on which sod (5) has been rolled. The device can be used to either load the sod roll (5) onto the truck bed (6) or unload it off the truck bed.

Figure 2:
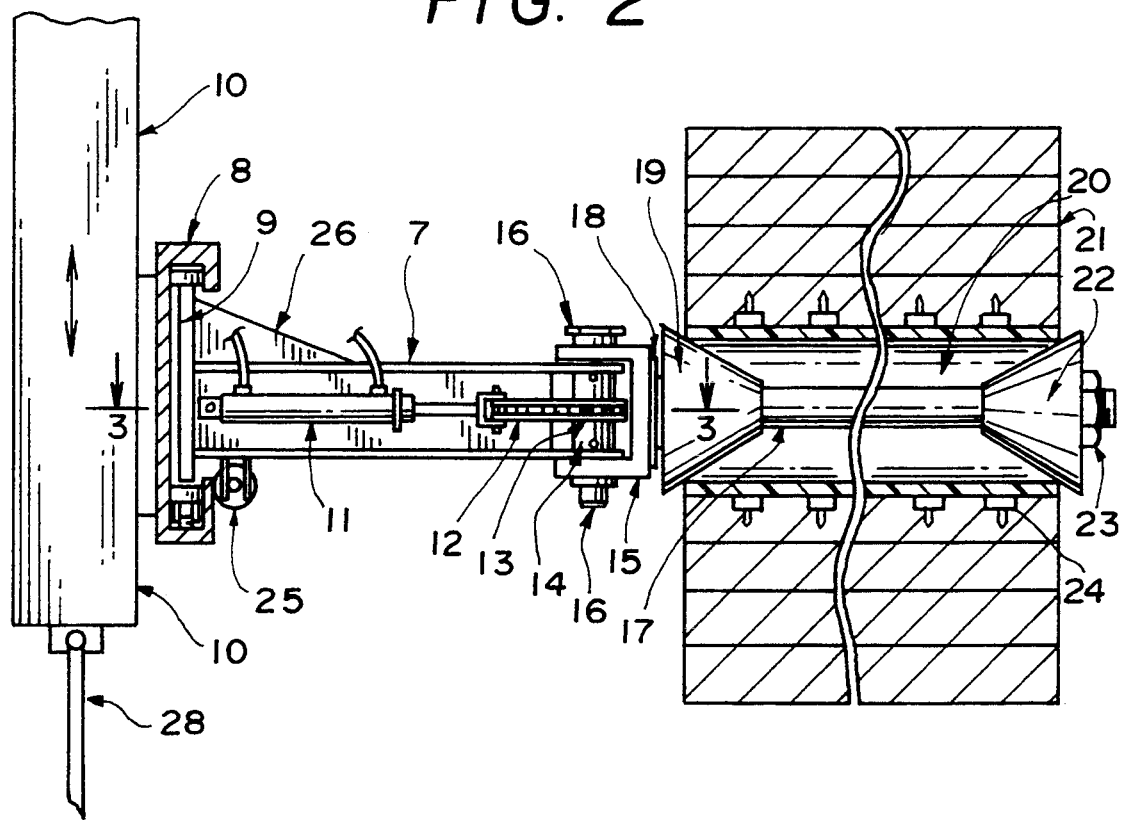
FIG. 2 is a sectional view along line 2—2 of FIG. 1.

FIG. 2 shows a close up, side view of the device along line 2—2 of FIG. 1. An I-beam of heavy steel (7) is attached by a shifting bracket (8) and roller plate (9) to the utility mounting plate (10) of a tractor/loader, modified fork lift, or a skid steer loader or any vehicle that has a suitable hydraulic capacity. It can be mounted to the front or to the rear of the vehicle. The I-beam (7)

houses two opposing hydraulic cylinders, only one of which is shown in this side view (11), which are connected by heavy roller chain (12) or steel linkage which runs around a sprocket (13) which is attached to a hollow cylinder (14). The hollow cylinder (14) in turn is attached to a heavy duty steel clevis (15) which pivots on and is attached to a sturdy hinge pin (16). When activated by the hydraulic cylinders, the clevis (15), from which protrudes a hollow steel spear (17), can be rotated either left or right through an arc slightly greater than 180 degrees. The spear (17) is welded to a plate (18) that is mounted by sunken bolts to the front of the clevis and can be quickly interchanged with spears of various lengths. A plastic rolling cone (19) is mounted on the spear to engage the tubing (20), which is typically 4" or 5" PVC pipe. The cone is able to rotate around the spear and roll or unroll the sod roll (21) depending on the direction taken by the tractor. An end cone (22) can be placed on the spear to steady the tubing and attached to the spear with a locking nut (23). Hooks, short protusions, or prongs (24) can be placed on the surface of the tubing to faciliate the grasping and initial starting of the sod roll in the harvesting mode. A shifting cylinder (25) allows the device to be shifted on the utility mounting plate to the left or to the right as desired to balance and to accurately position the sod roll. The structure is strengthened by a wing of stabilizing steel (26).

Included in the sod device and attached to the bottom of the utility plate (10) is a blade or rake (28) that makes it possible for the operator to grade and smooth his tracks as he installs the sod.

Referring now more particularly to FIG. 3, in which the device is shown in a top view, both shifting cylinders (11) can be seen on each side of the I-beam (7) with the two opposing cylinders attached by chain (12) to the sprocket (13) on the top side of the clevis (15). The hinge pin (16) is seen from top view. Manipulation of the hydraulic flow into the cylinders enables the operator to turn the sprocket, clevis, and spear, and hence roll of sod, from a forward direction to any position up to slightly more than 90 degrees either to the left or to the right in a plane horizontal to the ground. The hinged spear (17) and mounting plate (18) can be seen bolted to the front of the clevis (15). A plastic cone (19) with or without bearings (27) rotate on the spear and engage the PVC tubing (20) on which the cut sod is rolled.

An optional shifting bracket (8) can be inserted between the device and the utility plate (10) and the device attached to a roller plate (9) that allows it to be shifted right or left on a horizontal plane by an hydraulic cylinder (25). Or the device can be shifted on a rack and pinion.

Referring now more particularly to FIG. 4, which is a plan view of the sod device (1) attached on the front end of a tractor (3) at a harvesting site. The applicant's invention is shown with the spear (4) in a side position rolling up or harvesting cut sod (5). The sod device can be mounted either on the front or on the back of the tractor. In this figure the device is mounted on the front and the tractor moves backward to roll the cut sod onto PVC tubing into which is inserted the hinged spear. The PVC tubing is held in position on the spear by plastic cones which are free to rotate around the axis of the spear and effect the rolling of the tube and hence the sod. An optional bracket and roller plate or rack and pinion can be inserted between the device and the utility plate to give the operator the ability to shift the device in a lateral plane right or left as needed to control the sod roll. When the desired amount of sod is rolled onto the tube, the device lifts the roll off the ground, shifts it to a forward position, and places it on a truck bed.

FIG. 5 is a plan view similiar to FIG. 4 but in this case showing a tractor (3) and sod device (1) at the intallation site unrolling or installing a roll of sod (5) to the right. This tractor (typically the grading tractor) and sod device have taken the sod roll (5) off the delivery truck and have moved the sod roll in the forward position to the laying site. At the appropriate place the spear and large sod roll are turned, in this case to the right side. With the tractor moving backward the big roll of sod (5) is unrolled which in the figure is against another strip of sod that was laid previously. A large roll of sod is thus laid by only one person.

While this invention has been described in its preferred embodiment, many variations are possible without departing from the scope and spirit of the invention.

What is claimed is:

1. A device for handling large rolls of sod, operable by one person and comprising:
    a) a heavy duty horizontal beam member having upper and lower surfaces and proximal and distal ends,
    b) a clevis, pivotally attached to the distal end of said heavy duty beam member by a pin means extending through the upper and lower surfaces of the distal end thereof,
    c) a pivoting means for said clevis, located between the upper and lower surfaces of said heavy duty beam member,
    d) a bracket means attached directly to a utility vehicle,
    e) a roller plate to which the proximal end of said horizontal beam member is attached, movably connected by upper and lower rolling means to said bracket means, and
    f) a spear having proximal and distal ends, attached at its proximal end to said clevis.

2. The device of claim 1, wherein said bracket has a channel shape and said roller plate fits slidingly within said channel shape.

3. The device of claim 1, wherein said pivoting means comprises a hydraulic cylinder.

4. The device of claim 1, wherein said roller plate is slidingly movable in said bracket means in a horizontal plane by a hydraulic cylinder.

5. The device of claim 1, wherein said roller plate is slidingly movable in said bracket means in a horizontal plane by a rack and pinion.

6. The device of claim 1, wherein said clevis is pivotable in a horizontal plane through an arc greater than 180 degrees, the arc being centered on a line extending from said horizontal beam member.

7. The device of claim 6, wherein said pivoting means is a hydraulic cylinder.

8. The device of claim 1, wherein said spear is interchangeable with spears of differing lengths according to the size of sod roll desired.

9. The device of claim 1, further comprising
    a first truncated cone fitting annularly and rotatably around the proximal end of said spear,
    a tubular member having proximal and distal ends, fitting annularly and rotatably around said spear,
    a second truncated cone fitting annularly and rotatably around the distal end of said spear, said first and second cones facing inwardly to engage and steady said tubular member.

10. The device of claim 9, wherein said tubular member is interchangeable with tubular members of differing sizes according to the size of the sod roll desired.

11. A device for handling large rolls of sod, operable by one person and comprising:
   a) a heavy duty beam member having upper and lower surfaces and proximal and distal ends,
   b) a clevis, pivotally attached to the distal end of said heavy duty beam member,
   c) a pivoting means for said clevis, located between the upper and lower surfaces of said heavy duty beam member,
   d) a bracket means attached directly to a utility vehicle,
   e) a roller plate to which the proximal end of said horizontal beam member is attached to said bracket means, and
   f) a spear having proximal and distal ends, attached at its proximal end to said clevis.

12. A method of handling sod in large rolls, comprising the steps of
   a) providing a heavy duty beam member having upper and lower surfaces and proximal and distal ends,
   b) providing a clevis, pivotally attached to the distal end of said heavy duty beam by a pivoting means located between the upper and lower surfaces of said beam,
   c) providing a bracket means for attaching said device directly to a utility vehicle,
   d) providing a roller plate to which the proximal end of said horizontal beam member is attached, said roller plate being attached by upper and lower rolling means to said bracket means,
   e) providing a spear having proximal and distal ends, attached at its proximal end to said clevis,
   f) providing a tubular member having proximal and distal ends, engaged and steadied annularly, rotatably, and releasably around the spear provided in step (e) by conical members threadedly and annularly attached to the spear,
   g) attaching the bracket provided in step (b) to the utility vehicle, and
   h) rolling a strip of sod around the tubular member provided in step (f) by the movement of the utility vehicle to obtain a roll of sod.

13. The method of claim 12, further comprising a step (i) wherein the roll of sod obtained in step (h) is transported to a desired location and unrolled.

* * * * *